(12) United States Patent
Minoura et al.

(10) Patent No.: US 8,567,166 B2
(45) Date of Patent: Oct. 29, 2013

(54) BELT TENSIONING DEVICE FOR A RIDING TYPE MOWER

(75) Inventors: Akira Minoura, Osaka (JP); Akihito Sugio, Norcross, GA (US); Yoshikazu Togoshi, Osaka (JP); Eiji Sato, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/421,032

(22) Filed: Mar. 15, 2012

(65) Prior Publication Data

US 2013/0047567 A1    Feb. 28, 2013

(30) Foreign Application Priority Data

Aug. 31, 2011   (JP) .................................. 2011-189380

(51) Int. Cl.
*A01D 69/08*    (2006.01)

(52) U.S. Cl.
USPC ........................................................ 56/11.6

(58) Field of Classification Search
USPC .......... 56/11.3, 11.6, DIG. 22, 14.7; 474/109, 474/117, 135; 192/224.2
See application file for complete search history.

(56) References Cited

U.S. PATENT DOCUMENTS

| 3,709,062 | A | * | 1/1973 | Draege ............................ 474/63 |
| 4,068,452 | A |   | 1/1978 | Schaefer et al. |
| 4,102,114 | A | * | 7/1978 | Estes et al. ..................... 56/15.2 |
| 4,231,215 | A | * | 11/1980 | Klas ............................... 56/11.6 |
| 4,317,325 | A | * | 3/1982 | Marto ............................. 56/11.6 |
| 4,813,215 | A | * | 3/1989 | Chase et al. ................... 56/11.6 |
| 4,925,437 | A | * | 5/1990 | Suzuki et al. ................. 474/135 |
| 5,012,632 | A | * | 5/1991 | Kuhn et al. .................... 56/11.6 |
| 5,246,403 | A | * | 9/1993 | Uphaus ........................... 474/83 |
| 5,361,566 | A | * | 11/1994 | Hohnl ............................. 56/11.6 |
| 5,483,787 | A | * | 1/1996 | Berrios .......................... 56/10.1 |
| 5,769,747 | A | * | 6/1998 | Kuhn et al. .................... 474/135 |
| 5,836,144 | A | * | 11/1998 | Hohnl et al. .................. 56/320.1 |
| 6,282,873 | B1 | * | 9/2001 | Wilken ........................... 56/11.3 |
| 7,913,479 | B2 | * | 3/2011 | Eavenson, Sr. ................ 56/11.6 |

* cited by examiner

*Primary Examiner* — Árpád Fábián-Kovács
(74) *Attorney, Agent, or Firm* — Greenblum & Bernstein, P.L.C.

(57) ABSTRACT

A spring support body is slidably supported on a support portion provided to a connecting member connected to a link mechanism, the spring support body supporting a side of a tension spring opposite to the side connecting the tension spring to a tension wheel body, the tension spring biasing the tension wheel body to a tension position, the tension wheel body being freely movable between a tension position and a tension release position. An operation tool slides the spring support body between the tension side and the loosened side of the tension spring, the operation tool being connected to the spring support body by being disposed such that the operation tool is positioned on a lateral exterior side of a cutting blade housing with respect to the connecting member.

9 Claims, 8 Drawing Sheets

BELT TENSIONING DEVICE FOR A RIDING TYPE MOWER

CROSS-REFERENCE TO RELATED APPLICATIONS

The present application claims priority under 35 U.S.C. §119 of Japanese Application No. 2011-189380, filed on Aug. 31, 2011, the disclosure of which is expressly incorporated by reference herein in its entirety.

BACKGROUND OF THE INVENTION

1. Field of the Invention

The present invention relates to a riding type mower provided with a mowing apparatus supported by a link mechanism on the underside of a vehicle body so as to be freely raised and lowered; further provided with a cutting blade transmission belt being wrapped around a cutting blade drive pulley on an upper surface side of a cutting blade housing of the mowing apparatus; and further provided with a connecting member on the cutting blade housing, the connecting member connecting to the link mechanism.

2. Description of Related Art

A conventional mower such as that described in Related Art 1 is known. The mower includes a drive belt as a cutting blade transmission belt and an idler pulley around which the drive belt is wrapped, and further includes a clutch lever assembly operating the idler pulley such that the drive belt switches between a tension state and a loosened state.

[Related Art 1] U.S. Pat. No. 4,068,452

SUMMARY OF THE INVENTION

In the riding type mower described above, replacing the cutting blade transmission belt, removing the mowing apparatus from the vehicle body, and the like requires removing the cutting blade transmission belt. In order to enable the cutting blade transmission belt to be switched to a loosened state so that removal thereof is facilitated, when employing the conventional art described above, the structure tends to become complicated by a configuration enabling an operation tool to switch a tension wheel body between a tension position and a tension release position. In particular, when the operation tool has been deployed near a side end of the cutting blade housing, away from the tension wheel body, so as to facilitate operation of the operation tool from a lateral exterior side of the cutting blade housing, the configuration allowing the operation tool to couple with the tension wheel body tends to become larger.

An advantage of the present invention is to provide a riding type mower which is able not only to switch a cutting blade transmission belt to a loosened state with an operation tool through a simple operation, but also to allow ease of operation of the operation tool while maintaining a simple structure.

In one aspect of the present invention, the riding type mower is provided with a mowing apparatus supported by a link mechanism on an underside of a vehicle body so as to be freely raised and lowered; further provided with a cutting blade transmission belt wrapped around a cutting blade drive pulley on an upper surface side of a cutting blade housing of the mowing apparatus; and further provided with a connecting member on the cutting blade housing connected to the link mechanism. The cutting blade housing includes a tension wheel body freely movable between a tension position and a tension release position, the cutting blade transmission belt being wrapped around the tension wheel body. A spring support body is slidably supported on a support portion provided to a connecting member, the spring support body supporting a side of a tension spring opposite to the side connected to the tension wheel body, the tension spring biasing the tension wheel body to the tension position. An operation tool slides the spring support body between the tension side and the loosened side of the tension spring. The operation tool is connected to the spring support body by being disposed such that the operation tool is positioned on a lateral exterior side of the cutting blade housing with respect to the connecting member.

According to the configuration of this aspect of the present invention, when the operation tool slides the spring support body to a loosened side of the tension spring, the spring support body switches the tension wheel body to the tension release position using the tension spring. The cutting blade transmission belt is then switched to the loosened state.

According to the configuration of this aspect of the present invention, the spring support body is slidably supported by the support portion provided to the connecting member, the spring support body supporting the side of the tension spring opposite to the side connecting the tension spring to the tension wheel body. The operation tool is connected to the spring support body by being disposed such that the operation tool is positioned on a lateral exterior side of the cutting blade housing with respect to the connecting member. Therefore, the tension spring and the spring support body may be used as a clutch. In addition, while the operation tool and the tension wheel body are coupled by a structurally simple clutch employing the connecting member as a support for the spring support body, the operation of the operation tool from a lateral external side of the cutting blade housing may be made easy by positioning the same near the lateral end of the cutting blade housing as much as possible.

Accordingly, when replacing the cutting blade transmission belt, removing the mowing apparatus, and the like, the operation tool may be easily operated from the lateral external side of the cutting blade housing to switch the tension wheel body to the tension release position and switch the cutting blade transmission belt to the loosened state. The work may also be performed with better efficiency. Also, the coupling of the tension wheel body and the operation tool may be achieved with a simple structure and costs may thus be lowered.

According to the configuration of another aspect of the present invention, the connecting member includes as a support portion a through-hole through which the spring support body is inserted.

According to the configuration of this aspect of the present invention, by merely adding the simple device of providing a through-hole to the connecting member, the connecting member may be employed as a support for the spring support body.

Accordingly, the simple device may simply be added to the connecting member to employ the connecting member as a support for the spring support body, and costs may be lowered from this perspective, as well.

In another aspect of the present invention, an alignment screw is provided to alter the connection position of the operation tool on the spring support body in the slide direction of the spring support body.

According to the configuration of this aspect of the present invention, simply by operating the alignment screw, the connection position of the operation tool on the spring support body may be altered through a simple operation and the tension operation force from the tension spring may be altered.

Accordingly, in a case where the cutting blade transmission belt has stretched and the like, simply by operating the alignment screw, tension operation force may be adjusted through a simple operation and the cutting blade transmission belt may be aligned to an appropriate tension state.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
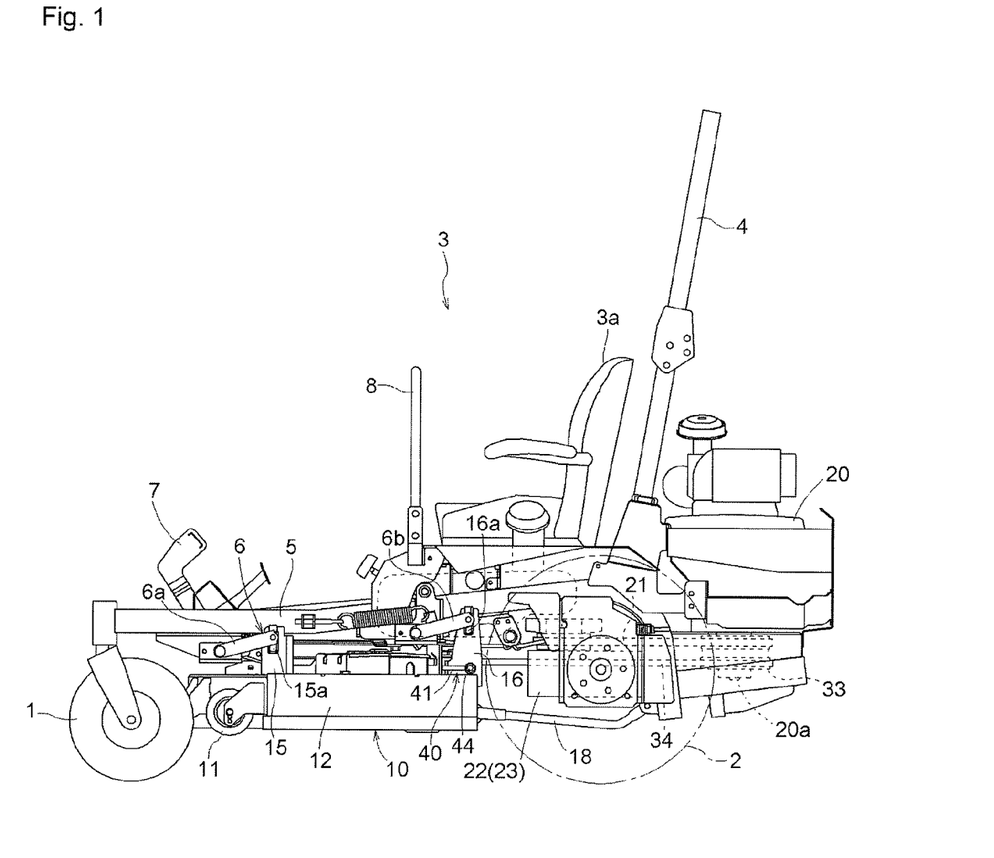
FIG. 1 is a lateral view illustrating the entirety of a riding type mower.
Figure 2:
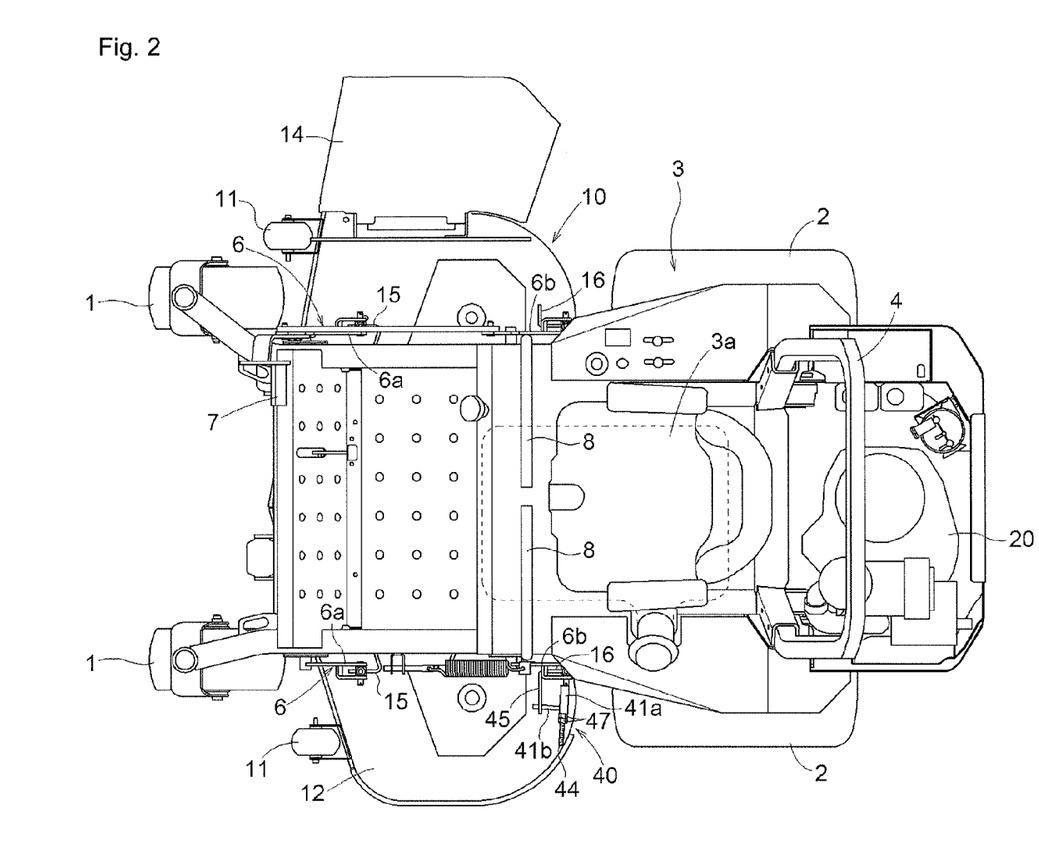
FIG. 2 is a plan view illustrating the entirety of the riding type mower.

Hereinafter, an embodiment of the present invention is described with reference to the drawings. FIG. 1 is a lateral view illustrating the entirety of a riding type mower according to an embodiment of the present invention. FIG. 2 is a plan view illustrating the full body of the riding type mower according to the embodiment. As shown in these figures, the riding type mower of the present embodiment is configured so as to be self-propelled with a left-right pair of caster-type front wheels 1 and by a left-right pair of drivable rear wheels 2. The riding type mower of the present embodiment is further configured with a self-propelled vehicle including a driver section 3 having a driver's seat 3a and a roll guard frame 4; and a mowing apparatus 10 supported by a link mechanism 6 on an underside of a vehicle body frame 5 of the self-propelled vehicle between the front and back wheels 1 and 2.

By oscillating/pivoting a pedal type elevating lever 7 provided in the driver section 3, the link mechanism 6 is vertically oscillated with respect to the vehicle body frame 5, and accordingly a gauge wheel 11 is raised and lowered by the link mechanism 6 between a lowered operative position in which the gauge wheel 11 is in contact with the ground and a raised non-operative position in which the gauge wheel 11 is raised off the ground. The riding type mower performs mowing work such as mowing a lawn with the mowing apparatus 10 by lowering the mowing apparatus 10 to the lowered operative position and driving the self-propelled vehicle.

The self-propelled vehicle is now described. With reference to FIGS. 1-4, the self-propelled vehicle includes an engine 20 provided in a rear portion of the vehicle body and a left-right pair of rear wheel drive apparatuses 22 in which an input shaft 22a is coupled by a drive transmission belt 21 to an output shaft 20a of the engine 20. The left-right pair of rear wheel drive apparatuses 22 includes a hydrostatic transmission 23 coupling the rear wheel 2 to the input shaft 22a. The drive force of the input shaft 22a is modified by the hydrostatic transmission 23 into forward drive power and reverse drive power. The speed of the forward drive power and the reverse drive power is then steplessly shifted and transferred to the rear wheel 2. The self-propelled vehicle includes a left-right pair of control levers 8 provided in the driving portion 3 and respectively coupled to operation portions of a left-right pair of hydrostatic transmissions 23. The left-right pair of control levers 8 is oscillated and when the left-right pair of rear wheels 2 is driven at the same drive speed in a forward direction and a rear direction by the left-right pair of hydrostatic transmissions 23, the self-propelled vehicle drives straight forward and straight backward. When the left-right pair of rear wheels 2 is driven by the left-right pair of hydrostatic transmissions 23 in different directions or in the same direction but at different drive speeds, the self-propelled vehicle drives in a circle.

Figure 3:
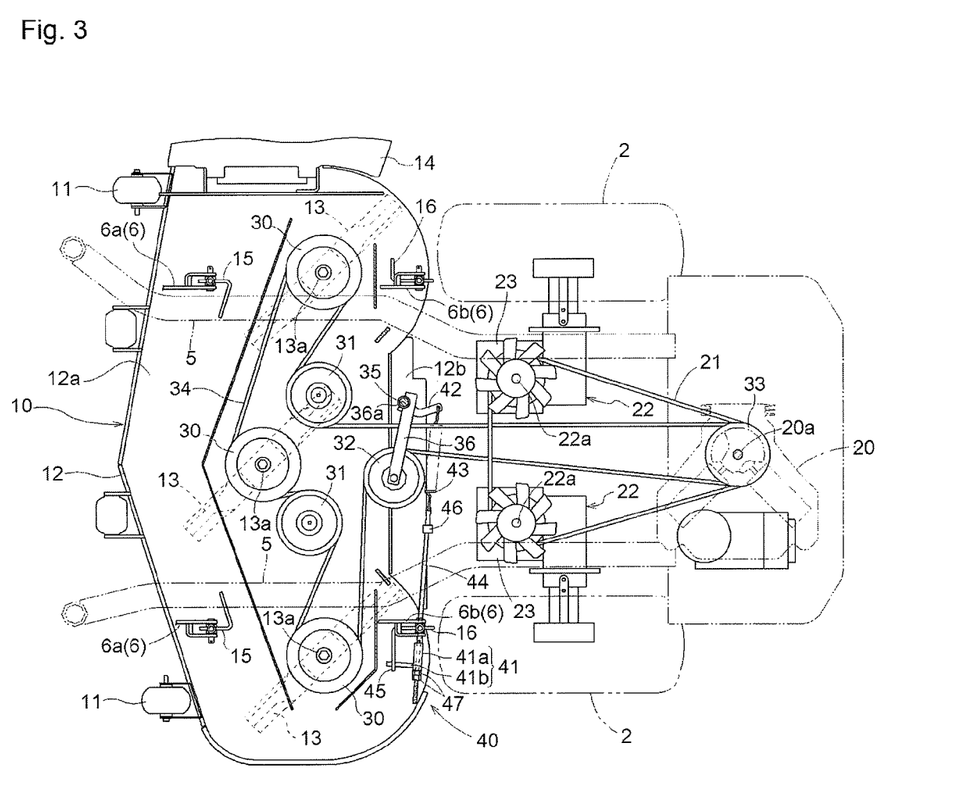
FIG. 3 is a plan view illustrating a drive transmission and a cutting blade transmission.
Figure 5:
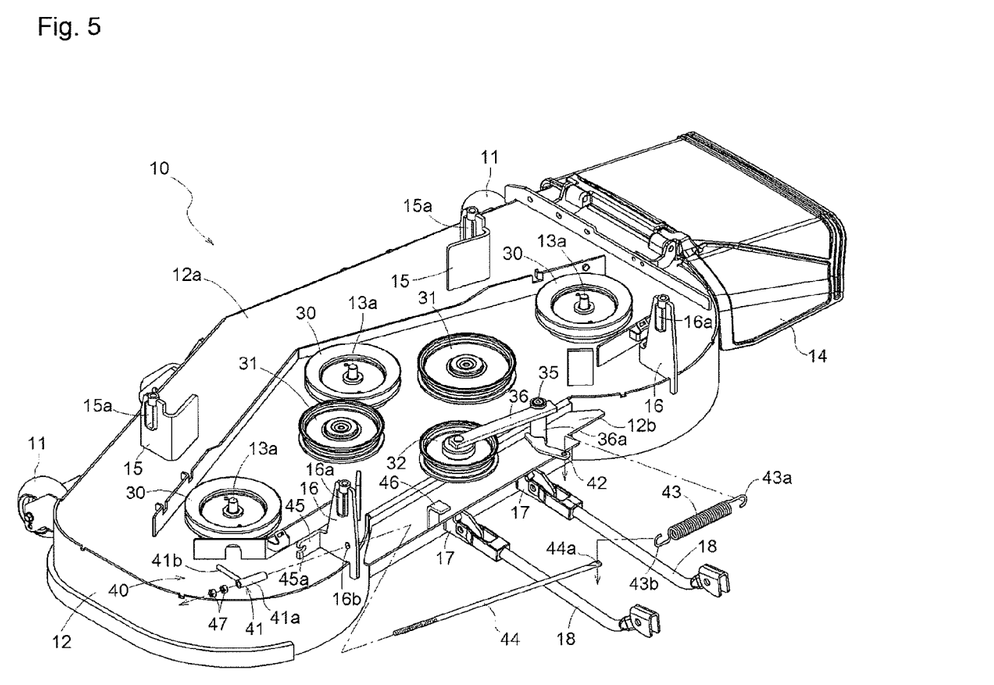
FIG. 5 is a perspective view of a mowing apparatus and an operation apparatus in an exploded state.

The mowing apparatus 10 is now described. With reference to FIGS. 1, 3, and 5, the mowing apparatus 10 is configured with a cutting blade housing 12 whose upper surface is connected to the link mechanism 6, and three rotatably driven blade-shaped cutting blades 13 aligned in a lateral vehicle body direction in the interior of the cutting blade housing 12. The three cutting blades 13 perform mowing by being rotatably driven due to drive power from the engine 20. Cut grass is conveyed through the interior of the cutting blade housing 12 to an exhaust opening positioned at a lateral end of the cutting blade housing 12 by a flow of conveying air generated by the rotation of the cutting blades 13. The cut grass is then expelled from the exhaust opening to a lateral exterior side of the cutting blade housing 12. The cut grass expelled from the exhaust opening is guided by an exhaust guide 14 extending from the cutting blade housing 12 and is expelled.

The cutting blade housing 12 includes a left-right pair of front side connecting members 15, 15 and a left-right pair of rear side connecting members 16. The left-right pair of front side connecting members 15 projects upward from two locations aligned in a lateral direction of the vehicle body on the front portion of a top panel 12a. The left-right pair of rear side connecting members 16 projects upward from two locations aligned in a lateral direction of the vehicle body on the rear portion of the top panel 12a. The left-right pair of front side connecting members 15 is respectively connected to a left-right pair of forward oscillating links 6a which configure the link mechanism 6. The left-right pair of rear side connecting members 16 is respectively connected to a left-right pair of reverse oscillating links 6b which configure the link mechanism 6. The respective connections between the connecting members 15 and 16 and the forward oscillating link 6a and the reverse oscillating link 6b are formed by a connecting pin slidably inserted into pin holes 15a, 16a running in the vertical direction of the vehicle body and provided to an upper portion of the connecting members 15 and 16, respectively. The connecting pin is supported by the forward oscillating link 6a and the reverse oscillating link 6b. The cutting blade housing 12 includes a left-right pair of connecting bodies 17 provided in the rear portion of a lateral wall. The cutting blade housing 12 is connected to the vehicle body frame 5 via an oscillating connection rod 18 extending from a left-right pair of connecting bodies 17.

Figure 4:
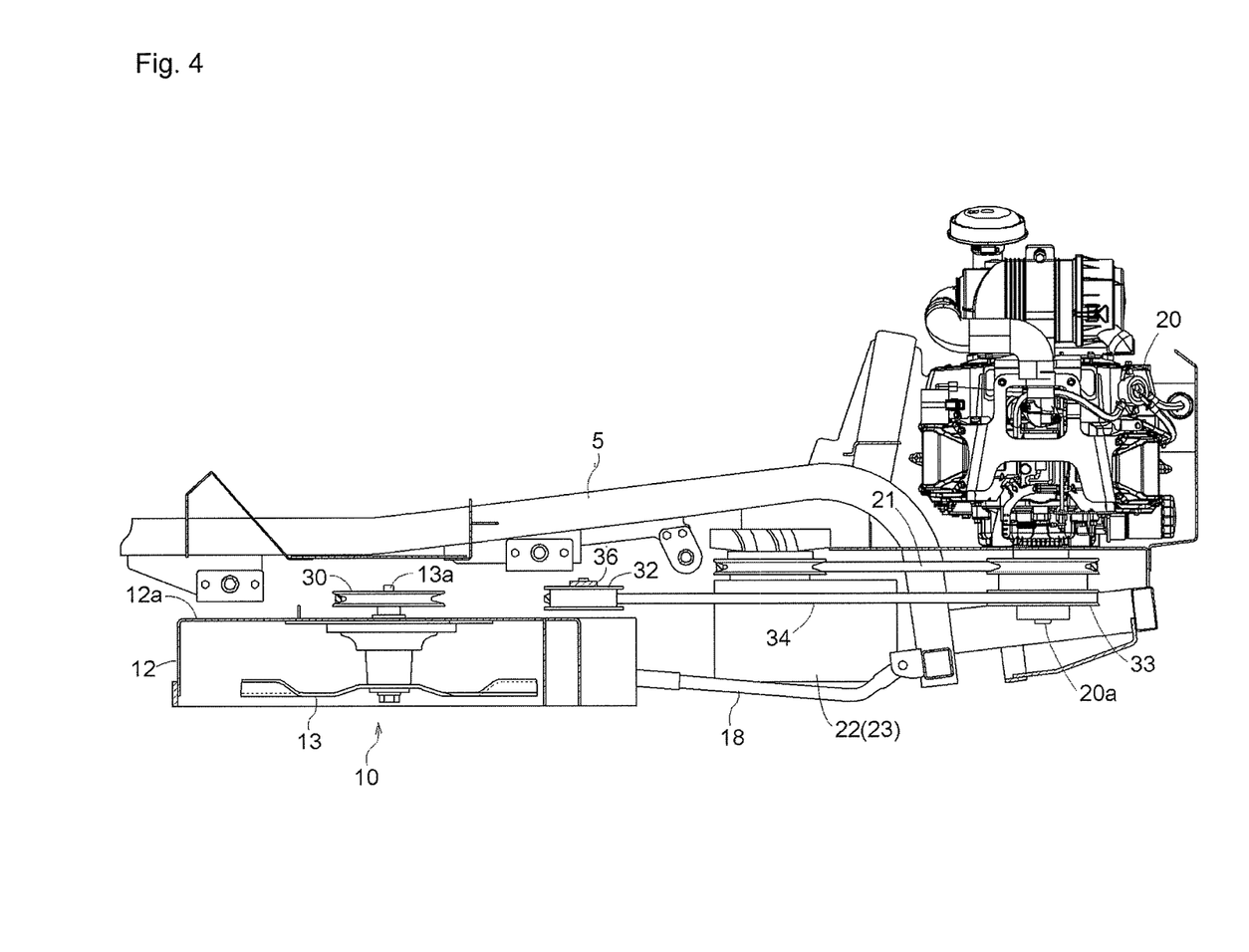
FIG. 4 is a lateral view illustrating the drive transmission and the cutting blade transmission.

With reference to FIGS. 3, 4, and 5, the top surface of the cutting blade housing 12 includes three cutting blade drive pulleys 30. The cutting blade transmission belt 34 is wrapped around the three cutting blade drive pulleys 30, two guide wheel bodies 31 rotatably provided on the top surface of the cutting blade housing 12, one tension wheel body 32, and an output pulley 33 integrally provided to be freely rotatable on the output shaft 20a of the engine 20. The three cutting blades 13 are driven thereby.

The three cutting blade drive pulleys 30 are integrally and rotatably connected to an end of a rotation support shaft 13a projecting upward from the top panel 12a of the cutting blade housing 12, the rotation support shaft 13a being oriented vertically on a vehicle body and integrally and rotatably supporting the cutting blades 13. The cutting blade transmission belt 34 is provided so that a portion thereof between the tension wheel body 32 and the output pulley 33 of the engine 20, as well as a portion thereof between one of the guide wheel bodies 31 and the output pulley 33, run beneath the drive transmission belt 21 which runs between the left-right pair of rear wheel drive apparatuses 22. The tension wheel body 32 doubles as a belt feed guide and the guide wheel body 31 doubles as a belt return guide.

The drive power of the output shaft 20a of the engine 20 runs along the cutting blade transmission belt 34 beneath the drive transmission belt 21 between the left-right pair of rear wheel drive apparatuses 22 and is fed to the region of the tension wheel body 32. The drive power is then transferred from the region of the tension wheel body 32 to the three cutting blade drive pulleys 30. Each of the cutting blade drive pulleys 30 drives the respective rotation support shaft 13a, thereby driving the cutting blades 13 in rotation around an axis-center of the rotation support shaft 13a oriented vertically to the vehicle body.

The tension wheel body 32 is positioned between the left-right pair of rear side connection members 16. The tension wheel body 32 is supported by an oscillating arm 36 pivotingly supported via a support shaft 35 oriented vertically to the vehicle body, on a support portion 12b attached to a board on an exterior surface side of the lateral wall board of the cutting blade housing 12. By oscillating the oscillating arm 36, the tension wheel body 32 oscillates with respect to the cutting blade housing 12 around the support shaft 35. The tension wheel body 32 is thus switched between the tension position and the tension release position. When the tension wheel body 32 is operated to the tension position, the cutting blade transmission belt 34 is pushed from outside of a loop to the inside of the loop to operate in the tension state for transmission. When the tension wheel body 32 is operated to the tension release position, pressure on the cutting blade transmission belt 34 is released and the cutting blade transmission belt 34 is operated in the loosened state.

With reference to FIG. 3, an operation apparatus 40 is equipped on the cutting blade housing 12, the operation apparatus 40 including an operation tool 41 positioned on the lateral external side of the cutting blade housing 12 with respect to the left side connecting member 16 of the left-right pair of rear side connecting members 16. The operation apparatus 40 switches the cutting blade transmission belt 34 between a tension state and a loosened state, and is configured as follows.

Figure 6:
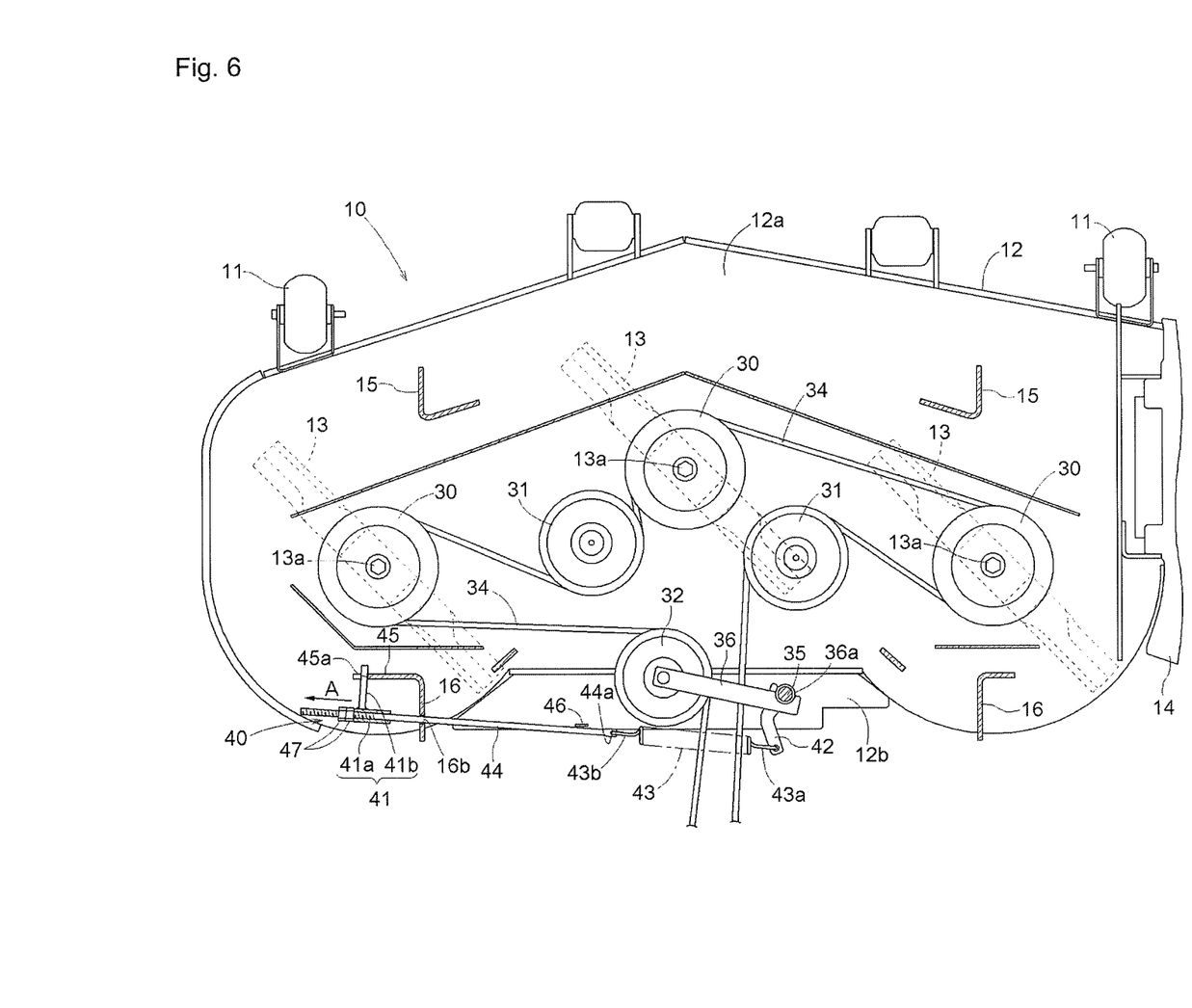
FIG. 6 is a plan view illustrating the operation apparatus in a tension operation state.
Figure 7:
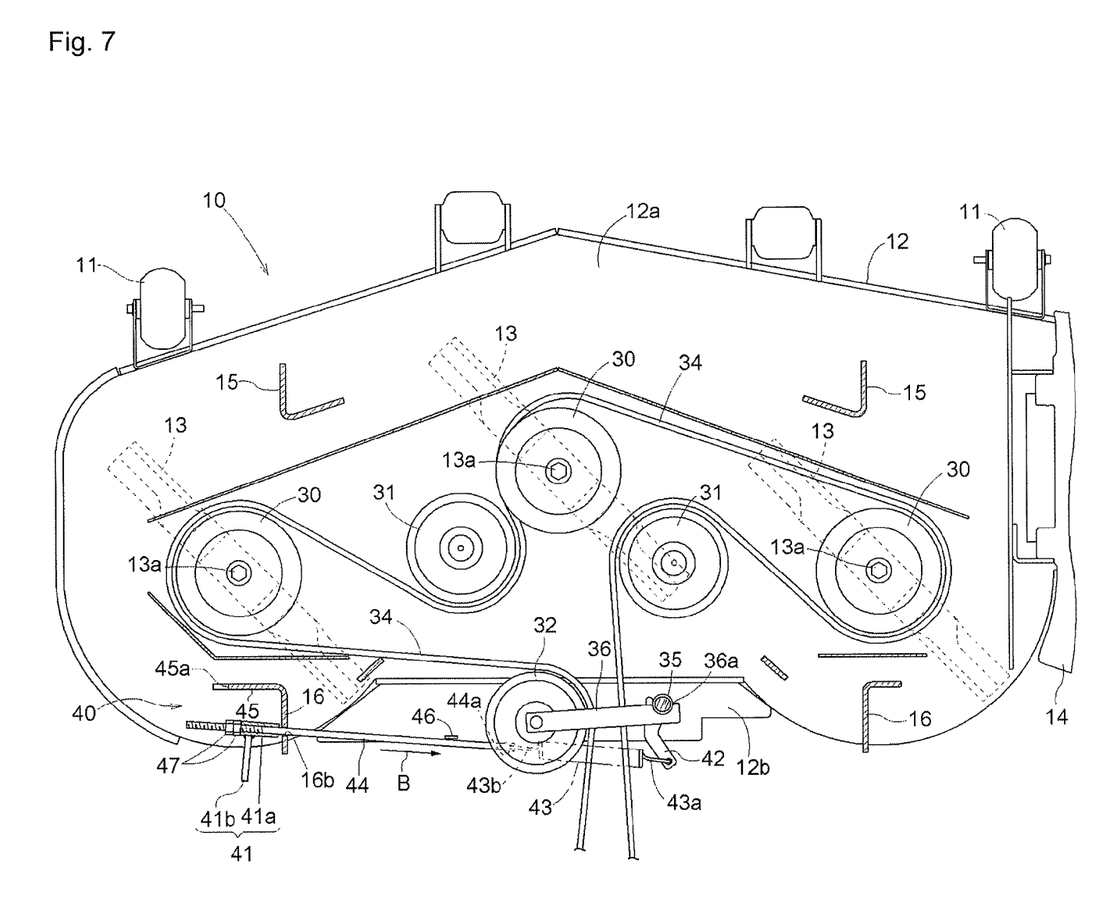
FIG. 7 is a plan view illustrating the operation apparatus in a loosened operation state.

FIG. 5 is a perspective view illustrating the operation apparatus 40 in an exploded state. FIG. 6 is a plan view illustrating the operation apparatus 40 during a tension operation state. FIG. 7 is a plan view illustrating the operation apparatus 40 during a loosened operation state. With reference to FIGS. 3, 5, 6, and 7, the operation apparatus 40 is configured with an operation arm 42, a tension spring 43, a spring support body 44, the operation tool 41, and a latching body 45. The operation arm 42 integrally and oscillatingly couples to the oscillating arm 36 by connecting to a cylindrical shaft 36a of the oscillating arm 36. The tension spring 43 is connected to the operation arm 42 on an end portion 43a. The spring support body 44 supports by latching an end portion 43b of the tension spring 43 to a support hole 44a, the end portion 43b being opposite to the end connected to the tension wheel body 32. The operation tool 41 is connected to an end portion of the spring support body 44 opposite to the side supporting the end portion 43b of the tension spring 43. The latching body 45 is provided to the cutting blade housing 12.

The spring support body 44 is configured from a rod oriented laterally to the vehicle body. The spring support body 44 is latched to a retaining body 46 provided on the support portion 12b of the cutting blade housing 12 between a region supporting the end portion 43b of the tension spring 43 and the region connected to the operation tool 41. Also, the spring support body 44 is slidably inserted through a through-hole 16b provided on the rear side connecting member 16. The spring support body 44 is then slidably supported by the retaining body 46 and the through-hole 16b and slides in a lateral direction of the cutting blade housing 12 to a tension side and to a loosened side of the tension spring 43.

The operation tool 41 is configured from a cylindrical connecting portion 41a and a lever portion 41b. The connecting portion 41a slidably and rotatably sheathes an end portion of the spring support body 44. The lever portion extends from the connecting portion 41a. The operation tool 41 has a configuration in which a stop action on an end portion 41c (see FIGS. 8A and 8B) of the connecting portion 41a is received from an alignment screw 47 mounted on an end portion of the spring support body 44. Accordingly, the operation tool 41 is connected to the spring support body 44 such that the spring support body 44 may be slidably operated to the tension side of the tension spring 43 and such that the spring support body 44 may be slidably operated to the loosened side of the tension spring 43.

The latching portion 45 includes a positioning recession 45a formed by a notch opening toward a lateral external side of the cutting blade housing 12. The lever portion 41b of the operation tool 41 latches to the positioning recession 45a and the operation tool 41 is accordingly retained in a predetermined operation position, resisting the tensile force of the tension spring 43. The latching body 45 is integrally formed on a base portion of the rear side connecting member 16.

Figure 8A:
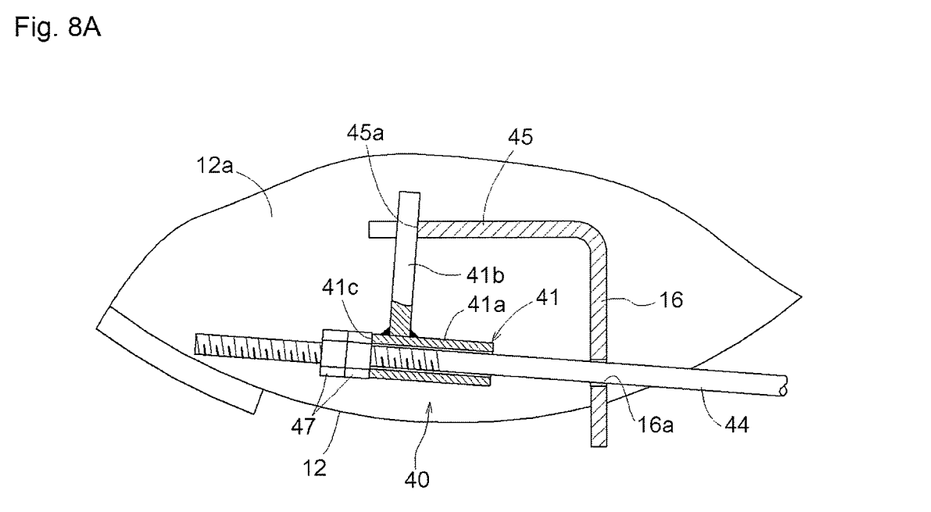
FIG. 8A is a sectional view illustrating an operation tool in a tension operation state.

Specifically, with reference to FIGS. 6 and 8A, the operation apparatus 40 moves the operation tool 41 in a distancing direction toward the lateral exterior side of the cutting blade housing 12 with respect to the connecting member 16. The lever portion 41b of the operation tool 41 operated in a predetermined operation position is latched to the positioning recession 45a of the latching body 45. Thereby, the tension operation state is entered and the cutting blade transmission belt 34 enters the tension state.

Specifically, the operation apparatus 40 moves the operation tool 41 to a lateral exterior side of the cutting blade housing 12 with respect to the connecting member 16. Accordingly, the operation apparatus 40 moves the spring support body 44 in a direction shown by an arrow A in FIG. 6 through the direct contact of the connecting portion 41a of the operation tool 41 and the alignment screw 47. The operation arm 42 is then oscillated via the tension spring 43 by the movement of the spring support body 44. The tension wheel body 32 is then switched to a tension position by oscillating the oscillation arm 36 to the tension side. With the cutting blade transmission belt 34 as a point of reactive force, the tension wheel body 32 being in direct contact therewith, the operation apparatus 40 pulls the tension spring 43 and elastically deforms the tension spring 43 to an extension side. The tension spring 43 is then maintained in an extended state by the latching body 45 retaining the operation tool 41 at the operation position.

Figure 8B:
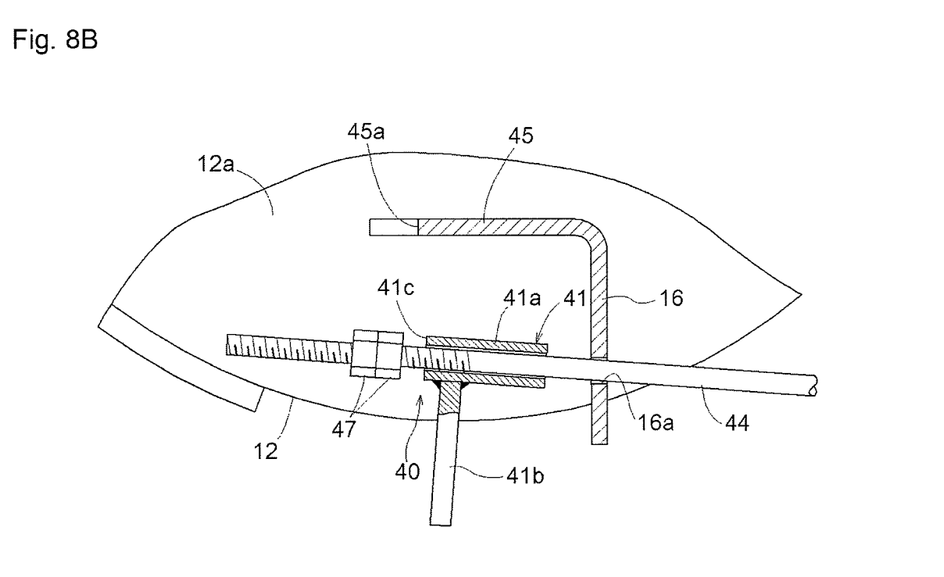
FIG. 8B is a sectional view illustrating an operation tool in a loosened operation state.

With reference to FIGS. 7 and 8B, the operation apparatus 40 moves the operation tool 41 retained by the latching body 45 in an approaching direction toward the lateral interior side of the cutting blade housing 12 with respect to the connecting member 16. The lever portion 41b of the operation tool 41 is disengaged from the positioning recession 45a of the latching body 45. The operation apparatus 40 thereby enters a loosened operation state and the cutting blade transmission belt 34 enters a loosened state.

Specifically, by releasing the hold of the latching body 45 on the operation tool 41, the operation apparatus 40 moves the spring support body 44 in a direction shown by an arrow B in FIG. 7 by the tensioning force of the cutting blade transmission belt 34 and the elastic resilience of the tension spring 43. The operation arm 42 then oscillates and the oscillation arm 36 is oscillated to the tension release side and the tension wheel body 32 is switched to the tension release position. In addition, the tension spring 43 is loosened.

The operation apparatus 40 has a configuration in which the connection position of the operation tool 41 on the spring support body 44 is set by the stop action of the alignment screw 47 on the connecting portion 41a. By rotating the alignment screw 47, the connection position of the operation tool 41 on the spring support body 44 is altered and aligned in a slide direction of the spring support body 44. The tensile force imparted to the tension spring 43 by the latching body 45 retaining the operation tool 41 is altered and the tensile force imparted to the cutting blade transmission belt 34 is modified.

Alternative Examples (1) In the embodiment described above, an example was given configured such that the connecting member 16 includes the through-hole 16b and the spring support body 44 is slidably supported by the through-hole 16b. However, the connecting member 16 includes a support portion having a hook shape, an arm shape, and the like projecting to an exterior side from the connecting member 16. An embodiment is also possible configured such that the spring support body 44 is slidably supported by the support portion.

(2) In the embodiment described above, an example was given disposed such that the operation tool 41 is positioned on a lateral exterior side of the cutting blade housing 12 with respect to the left side connecting member 16. However, an embodiment is also possible disposed such that the operation tool 41 is positioned on a lateral exterior side of the cutting blade housing 12 with respect to the right side connecting member 16.

(3) In the embodiment described above, an example was given in which the cutting blade transmission belt 34 is wrapped around the cutting blade drive pulleys 30 and the output pulley 33 of the engine 20. However, an embodiment is also possible in which a cutting blade transmission belt and an input belt are separately provided, the cutting blade transmission belt being wrapped around the cutting blade transmission pulleys 30 and an input pulley in the mowing apparatus 10, the input belt being wrapped around the input pulley of the mowing apparatus 10 and the output pulley 33 of the engine 20, and in which the tension wheel body 32 is provided acting separately on each of the cutting blade transmission belt and the input belt.

(4) In the embodiment described above, an example was given including three cutting blades 13 in the mowing apparatus 10. However, an embodiment is also possible including other than three cutting blades 13 in the mowing apparatus 10, such as two cutting blades, four cutting blades, and the like.

The present invention may be employed as a riding type mower having a mowing apparatus configured so as to cut grass with cutting blades having a blade shape as well as a mowing apparatus configured so as to cut grass with cutting blades having a reel shape.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A riding type mower comprising:
a mowing apparatus supported by a link mechanism on an underside of a vehicle body so as to be freely raised and lowered;
a cutting blade transmission belt wrapped around a cutting blade drive pulley on an upper surface of a cutting blade housing of the mowing apparatus; and
a member provided on the upper surface of the cutting blade housing, wherein:
the cutting blade housing includes a tension wheel body freely movable between a tension position and a tension release position, the cutting blade transmission belt being wrapped around the tension wheel body;
a cylindrical shaft is structured and arranged to swing the tension wheel body;
an operation arm is integrally and oscillatingly coupled to the cylindrical shaft;
a spring support body is slidably supported on a support portion provided to the member, the spring support body supporting a side of a spring opposite to a side connected to the tension wheel body via the operation arm, the spring biasing the tension wheel body to the tension position;
an operation tool slides the spring support body between a tension side and a loosened side of the spring, the operation tool being connected to the spring support body by being disposed such that the operation tool is positioned on a lateral exterior side of the cutting blade housing with respect to the member;
a first end of the spring is connected to the spring support body; and
a second end of the spring is connected to the operation arm.

2. The riding type mower according to claim 1, wherein the member includes as the support portion a through-hole through which the spring support body is inserted.

3. The riding type mower according to claim 1, wherein an alignment screw is provided to alter the connection position of the operation tool on the spring support body in the slide direction of the spring support body.

4. The riding type mower according to claim 1, further comprising a latching body arranged on the cutting blade housing, wherein:
the latching body retains the operation tool at the tension side; and
the operation tool contacts the member at the loosened side.

5. The riding type mower according to claim 4, wherein the latching body includes a positioning recession formed by a notch opening toward a lateral external side of the cutting blade housing and the operation tool is latchable to the positioning recession.

6. The riding type mower according to claim 4, wherein the latching body is integrally formed with the member.

7. The riding type mower according to claim 1, wherein:
the spring is a tensioning spring;
the operation tool is structured and arranged to be pulled toward a vehicle exterior side at the tension side; and
the operation tool is structured and arranged to be moved back toward a vehicle interior side at the loosened side.

8. The riding type mower according to claim 1, wherein:
the member is connected to the link mechanism.

9. A riding type mower comprising:
a mowing apparatus supported by the link mechanism mounted to a vehicle body frame so as to be freely raised and lowered;
a cutting blade transmission belt wrapped around a cutting blade drive pulley on an upper surface of a cutting blade housing of the mowing apparatus; and
a latching body arranged on the cutting blade housing, wherein:
the cutting blade housing includes a tension wheel body freely movable between a tension position and a tension release position, the cutting blade transmission belt being wrapped around the tension wheel body;
a spring support body is slidably supported on a support portion provided to a member provided on the upper surface of the cutting blade housing, the spring support body supporting a side of a tension spring opposite to a side connected to the tension wheel body, the tension spring biasing the tension wheel body to the tension position;
an operation tool slides the spring support body between a tension side and a loosened side of the tension spring, the operation tool being connected to the spring support body by being disposed such that the operation tool is positioned on a lateral exterior side of the cutting blade housing;
the latching body retains the operation tool at the tension side; and
the operation tool contacts the member at the loosened side.

* * * * *

UNITED STATES PATENT AND TRADEMARK OFFICE
CERTIFICATE OF CORRECTION

PATENT NO.         : 8,567,166 B2                                    Page 1 of 1
APPLICATION NO.    : 13/421032
DATED              : October 29, 2013
INVENTOR(S)        : A. Minoura et al.

It is certified that error appears in the above-identified patent and that said Letters Patent is hereby corrected as shown below:

On the Title Page (54), Title of the Invention, please insert --A-- before Belt.

Signed and Sealed this
Third Day of April, 2018

Andrei Iancu
*Director of the United States Patent and Trademark Office*